United States Patent [19]

Chono et al.

[11] Patent Number: 5,102,589
[45] Date of Patent: Apr. 7, 1992

[54] METHOD OF MAKING PORE-FREE MOLDING WITH THICK SECTION

[75] Inventors: Koji Chono; Hiroshi Ozeki, both of Kurashiki; Kazunori Toshima, Kitamoto; Motoyuki Yamato, Kanagawa, all of Japan

[73] Assignee: Nippon Zeon Co., Ltd., Tokyo, Japan

[21] Appl. No.: 491,882

[22] Filed: Mar. 12, 1990

[30] Foreign Application Priority Data

Mar. 15, 1989 [JP] Japan .................... 1-60656

[51] Int. Cl.⁵ .................... B29C 45/78; C08F 32/00
[52] U.S. Cl. .................... 264/40.6; 264/237; 264/327; 264/328.2; 264/328.6; 264/328.14; 264/328.16; 264/328.17; 264/328.18; 264/331.12; 264/331.13; 264/331.17; 525/290; 526/283
[58] Field of Search .................... 264/40.6, 237, 240, 264/327, 328.2, 328.6, 328.14, 328.16, 328.17, 328.18, 331.12, 331.13, 331.17, 348, DIG. 65; 525/290; 526/283

[56] References Cited

U.S. PATENT DOCUMENTS

| | | | |
|---|---|---|---|
| 2,376,655 | 5/1945 | Brotz | 264/DIG. 65 |
| 2,889,441 | 6/1959 | McMinn et al. | 264/DIG. 65 |
| 4,309,379 | 1/1982 | Dannels et al. | 264/328.2 |
| 4,380,617 | 4/1983 | Minchak et al. | 526/283 X |
| 4,426,502 | 1/1984 | Minchak | 526/172 |
| 4,469,809 | 9/1984 | Klosiewicz | 502/117 |
| 4,696,985 | 9/1987 | Martin | 526/283 X |
| 4,952,348 | 8/1990 | Ishimaru et al. | 264/40.6 |

FOREIGN PATENT DOCUMENTS

| | | |
|---|---|---|
| 139170 | 5/1985 | European Pat. Off. |
| 142861 | 5/1985 | European Pat. Off. |
| 269948 | 6/1988 | European Pat. Off. |
| 58-127728 | 7/1983 | Japan . |
| 58-129013 | 8/1983 | Japan . |
| 59-51911 | 3/1984 | Japan . |
| 60-79035 | 5/1985 | Japan . |
| 60-186511 | 9/1985 | Japan . |
| 61-120814 | 6/1986 | Japan . |
| 61-126115 | 6/1986 | Japan . |
| 63-186730 | 8/1988 | Japan . |
| 387207 | 2/1933 | United Kingdom ........... 264/328.14 |

Primary Examiner—Leo B. Tentoni
Attorney, Agent, or Firm—Thoburn T. Dunlap; George A. Kap

[57] ABSTRACT

A method of producing a pore-free polynorbornene article having thick-walled portions is provided. The method comprises providing a monomer charge containing at least one norbornene monomer having a tricyclic or higher cyclic structure; introducing the monomer charge into a mold at a temperature greater than the inside mold temperature; polymerizing the monomer charge under pressure via a ring-opening catalyst system; cooling the molded article; and removing the molded article from the mold.

9 Claims, No Drawings

METHOD OF MAKING PORE-FREE MOLDING WITH THICK SECTION

REFERENCE TO RELATED APPLICATION

This application is related to patent application Ser. No. 242,842 entitled "Process For Preparing Shaped Article Having Thick Section" which was filed Sept. 12, 1988, now U.S. Pat. No. 4,952,348.

BACKGROUND OF INVENTION

Progress has recently been made in the development of technology for reaction injection molding (called RIM below) using polycyclic norbornene monomers represented by dicyclopentadiene. The molding that is obtained by this method has a low hygroscopicity and has good dimensional stability. It is also lightweight and superior in heat resistance. However, the molding obtained by this RIM method is often thin, with a thickness of 10 mm or less, and thick-walled moldings, such as materials used for cutting processes, etc., cannot be obtained. Moreover, it is difficult to produce RIM thick-walled moldings without pores used in fields where high mechanical strength is needed, for example, materials for cutting processes, metalworking, and casting. Bulk polymerization of norbornene monomers by RIM is usually performed by feeding a reaction solution at room temperature or near room temperature to a mold that is kept at a high temperature of 90° to 130° C. and therefore, polymerization begins from the mold wall surface that is kept at a high temperature.

Thus, there is a problem in that the outside periphery solidifies sooner and pores or spaces that are 1 mm or larger and sometimes 5 mm, or so-called nests, are easily produced in the center of the molding where solidification is delayed. There is therefore a problem in that not only are these inappropriate as materials for cutting, but there is also a marked loss of commercial value as other types of moldings.

The inventors previously discovered that (1) the method whereby the maximum exothermic temperature of the reaction product is controlled to 160° C. or less and (2) the method whereby temperature differences inside the reaction product are kept to less than 80° C. during the cooling period from the maximum curing exothermic temperature of the reaction product to the glass transition temperature of the reaction product are effective methods for solving these problems and presented a patent application (Ser. No. 242,842), now U.S. Pat. No. 4,952,348.

However, the method in (1) is difficult to use in terms of productivity because the reaction must proceed gradually. Moreover, there is a problem with the method in (2) in that for some reason, when pores are formed during the polymerization reaction, it is impossible to eliminate these pores.

The inventors performed intense studies in order to develop a method for efficiently obtaining essentially pore-free thick-walled moldings of polycyclic norbornene monomers. As a result, they discovered that it is necessary to restrict the temperature of the monomer that is fed to the mold and that as long as this condition is used in combination with the aforementioned method in (2), larger thick-walled moldings than those produced with conventional methods that are still essentially pore-free can be obtained. This invention was completed based on this knowledge.

SUMMARY OF THE INVENTION

This invention is directed to a method for manufacturing essentially pore-free thick-walled moldings of a norbornene polymer which is characterized by the fact that after a norbornene monomer of tricyclic or higher cyclic structure that includes a metathesis catalyst system is injected into a mold at a temperature higher than the inside of the mold, bulk polymerization is performed while pressurizing the inside of the mold; and to a method for manufacturing essentially pore-free thick-walled molding of a norbornene polymer which is characterized by the fact that temperature differences inside the reaction product are kept to less than 80° C. during the cooling period from the maximum curing exothermic temperature of the reaction temperature to the glass transition temperature of said reaction product after batch ring-opening polymerization using a metathesis catalyst system while pressurizing the inside of the mold.

DETAILED DESCRIPTION OF INVENTION

The method used to make a substantially pore-free molding having a thick section exceeding a thickness of 20 mm involves ring-opening polymerization of a monomer having at least one norbornene group and at least three cyclic groups in the presence of a metathesis catalyst system. The method is characterized by injecting monomer portions containing catalyst and cocatalyst components at a temperature higher than the inside mold temperature while pressurizing the inside of the mold. The method also includes, in a preferred embodiment, the step of cooling from the maximum curing exothermic temperature of the monomer mixture to the glass transition temperature (Tg) of the molded polymer product by maintaining the temperature between the inside and outside of the molded polymer product to less than 80° C.

The monomer that is used as the starting material of the thick-walled molding in this invention is a polycyclic norbornene monomer of tricyclic or higher cyclic structure. A polymer with a high heat deformation temperature is obtained by using a tricyclic or higher cyclic structure and therefore, the heat resistance necessary for use of thick-walled moldings for cutting can be obtained.

Moreover, by means of this invention it is preferred that the polymer that is produced be a thermosetting polymer. Consequently, at least 10 weight percent, preferably 30 weight percent or more, of the total monomer should be monomer with crosslinking properties. Melting by heat of friction during cutting can be prevented when a thermosetting resin is employed, and cutting properties are markedly improved.

Examples of the norbornene monomer of a tricyclic or higher cyclic structure are tricyclic monomers such as dicyclopentadiene, dihydrodicyclopentadiene, etc., tetracyclic monomers such as tetracyclododecene, etc., pentacyclic monomers such as tricyclopentadiene, etc., heptacyclic monomers such as tetracyclopentadiene, etc., alkyl substituents thereof such as methyl, ethyl, propyl, and butyl substituents; alkylidene substituents thereof such as ethylidene substituents; and aryl substituents thereof such as phenyl and tolyl substituents.

On the other hand, the monomer with crosslinking properties is a polycyclic norbornene monomer with two or more reactive double bonds. Actual examples are dicyclopentadiene, tricyclopentadiene, tetracyclopentadiene, etc. Consequently, it is not necessary to use a special monomer with crosslinking properties when the norbornene monomer is the same as the monomer with crosslinking properties.

These norbornene monomers can be employed alone or two or more can be mixed and used. The term "predominant amount" means more than 50% by weight whereas the term "smaller amount" means less than 50% by weight, preferably less than 20%, and especially 1 to 10%.

Furthermore, one or more of the aforementioned norbornene monomers with a tricyclic or higher cyclic structure can be used with a bicyclic norbornene monomer such as 2-norbornene, 5-methyl-2-norbornene, 5-ethylidene-2-norbornene, 5-phenyl-2-norbornene, etc., that can be ring-open polymerized, or a monocyclic cycloolefin such as cyclobutene, cyclopentene, cyclopentadiene, cyclooctene, cyclododecene, etc., as long as it is within a range where the purpose of this invention is not lost.

Cyclopentadiene trimers can also be used as comonomers. Such trimers can be prepared by heating dicyclopentadiene or another norbornene monomer at 120° to 150° C. for one-half to 20 hours in an inert atmosphere.

The metathesis catalyst used in this invention can be any metathesis catalyst system as long as it is a conventional metathesis catalyst system that is used for ring-opening polymerization of norbornene monomer, such as disclosed in Japanese Kokai Patents Sho 58-127728 (1983), Sho 58-129013 (1983), Sho 59-51911 (1984), Sho 60-79035 (1985), Sho 60-186511 (1985), Sho 61-126115 (1986), etc.

Actual examples of metathesis catalysts are halides, oxyhalides, oxides, organic ammonium salts, etc., of tungsten, molybdenum, tantalum, etc. Suitable metathesis catalysts are the tungsten compounds of tungsten hexachloride, tungsten oxytetrachloride, tungsten oxide, tridodecylammonium tungstate, tri(tridecyl)ammonium tungstate, trioctylammonium tungstate, etc., the molybdenum compounds of molybdenum pentachloride, molybdenum oxytrichloride, tridodecylammonium molybdate, methyltricaprylammonium molybdate, tri(tridecyl)ammonium molybdate, trioctylammonium molybdate, etc., the tantalum compounds of tantalum pentachloride, etc.

Of these, it is preferred that a catalyst that is soluble in the norbornene monomer used in the reaction be employed and, in view of this, organic ammonium salts are used. When the catalyst is a halide, the catalyst can be solubilized by pretreatment with an alcohol or phenol compound. Moreover, when necessary, chelation agents, such as acetyl acetone and acetic acid alkyl esters, and Lewis bases, such as benzonitrile and tetrahydrofuran, can also be added. Early polymerization can thereby be prevented.

Actual examples of the activator or cocatalyst are alkyl aluminum halides, alkoxyalkyl aluminum halides, aryloxyalkyl aluminum halides, organotin compounds, etc. Appropriate examples are ethyl aluminum dichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, tetrabutyltin, the reaction product of alkylaluminum halide and an alcohol, etc.

Of these activators or cocatalysts, alkoxyalkylaluminum halides and aryloxyalkylaluminum halides have the optimum pot life at room temperature when the catalyst component has been mixed in and are therefore useful in terms of handling the catalyst mixture, as disclosed in the Japanese Kokai Patent Sho 59-51911 (1984).

There is a problem with alkylaluminum halides in that when the catalyst is mixed, polymerization begins immediately. However, in this case, initiation of polymerization can be delayed by using a modifier, such as an ether, ester, ketone, nitrile, or alcohol, with the activator or cocatalyst, as disclosed in the Japanese Kokai Patents Sho 58-129013 (1983) and Sho 61-120814 (1986). If these modifiers are not used, precautions in terms of equipment and handling are necessary because of the short pot life. Nevertheless, when the catalyst has a short pot life, it is difficult to efficiently eliminate the heat of the reaction because the reaction proceeds very quickly and therefore, it is preferred that the catalyst system have a pot life of 5 minutes or longer, preferably 10 minutes or longer, and most preferably, 30 minutes or longer, at 25° C.

In addition to the catalyst and activator, halogenated hydrocarbons, such as carbon tetrachloride, hexachlorocyclopentadiene, etc., can also be used as disclosed in the Japanese Kokai Patent Sho 60-79035 (1985). Furthermore, halogen source selected from halides, such as tin tetrachloride, silicon tetrachloride, magnesium chloride, germanium chloride, etc., can be used, as disclosed in the Japanese Kokai Patent Sho 63-186730 (1988). Amount of the halogen source is 0.05 to 10 millimoles, preferably 0.1 to 2 millimoles, per mole of the norbornene monomer.

The metathesis catalyst is usually used within a range of approximately 0.01 to 50 millimoles, preferably 0.1 to 10 millimoles, per 1 mole of norbornene monomer. The activator or cocatalyst is normally used within the molar range of 0.1 to 200, preferably 2 to 10, per mole of the catalyst component.

It is preferred that the metathesis catalyst and activator be dissolved in monomer and used. However, as long as it is within a range where the properties of the product are not lost, they can be suspended or dissolved in a trace of solvent and then used.

By means of this invention, pore-free and thick-walled molding can be manufactured by introducing a reaction starting liquid kept at a temperature higher than the temperature of the inside of the mold, to a mold, which is kept at a lower temperature, and then performing bulk polymerization under increased pressure inside the mold.

The reaction starting liquid that is made from norbornene monomer containing metathesis catalyst is fed into the mold within a temperature range of usually 20° to 50° C. The temperature inside the mold is kept at a lower temperature than the temperature of the reaction starting liquid. However, the temperature difference between the two should be 5° C. or more, preferably 10° C. or more, and most preferably 15° C. or more. By setting the temperature difference in this way and making the temperature of the reaction liquid higher than the temperature inside the mold, the problem of when solidification from the center of the molding begins, or delayed solidification in the center of the molding, is solved and therefore, the formation of pores is prevented.

Moreover, bulk polymerization is performed while pressurizing the inside of the mold. Pressure is usually increased by 0.5 kg/cm$^2$ or more, preferably 1 kg/cm$^2$ or more, and most preferably 2 kg/cm². By performing pressurization, formation of pores is prevented, even when the maximum exothermic temperature of the cured product exceeds 160° C. Pressurization of the inside of the mold can be performed by introduction of inert gas directly into the mold using an inert gas, such as nitrogen or argon, or by introduction of inert gas to the feed line of the reaction starting liquid.

By means of the preferred method for manufacturing a thick-walled molding, the norbornene monomer is introduced to separate vessels as two liquids and metathesis catalyst is then added to one vessel, while activator is added to the other in order to prepare two types of stable reaction solution. These two types of reaction solutions are then mixed and the reaction starting liquids that are obtained are injected into the mold of the desired shape. As a result, ring-opening polymerization by the bulk method is initiated and a thick-walled molding is obtained. The two types of reaction solutions can be mixed in a mixing head, and they can be injected into the mold through an injection line.

There are no special restrictions to the type of injection. however, when the pot life at room temperature is relatively long, injection to the mold can be performed once, several, or if necessary, many times, once mixing of the two types of reaction solutions in the mixer has been completed, as disclosed, for instance, in the Japanese Kokai Patent Sho 59-51911 (1984). Moreover, the mixture can also be continuously fed. There are no special restrictions to injection pressure. However, 20 kg/cm² or less is usually sufficient and it is preferred that injection be performed at approximately normal pressure.

This invention is not limited to the use of two types of reaction solutions. Various changes are possible, such as using a third stream by introducing reaction solution and additives to a third vessel.

Polymerization time can be freely selected. However, it is usually two minutes to 1 hour.

Moreover, the components used in the polymerization reaction should be stored and handled in an inert gas atmosphere of nitrogen gas etc. The mold or frame can be sealed with an inert gas, but this is not essential.

It is not necessary to use the expensive molds normally used for thermoplastic resins because RIM is employed in this invention. In general, when thick-walled moldings are molded, metal molds made of steel, aluminum, etc., or resin molds made of epoxy resin, unsaturated polyester resin, polyfluoroethylene, etc., are used in accordance with conventional methods.

However, when the thick-walled molding made in the manner described herein is used as a machinable stock, molds made of materials other than the aforementioned materials, such as wood, etc., can be used, as long as these materials can withstand the curing exothermic temperature. Because, in contrast to injection molding of thermoplastic resins, a system whereby reaction and curing are performed in the mold after injection of a reaction starting liquid with a low viscosity is used and mechanical working is performed after the machinable stock is obtained. Therefore, a precision mold is not needed. Machinable stocks, so-called block materials for finishing, are usually round bars, square bars, thick sheets, pipes, etc., and therefore, the mold can be made into the desired shape. Injection of the reaction starting liquid can be from the top of the mold or from the bottom of the mold.

The reaction solution that has started to react reaches the maximum curing exothermic temperature and the polymerized article is then removed while being cooled once the reaction to a rigid object has been completed. The maximum curing exothermic temperature varies with the composition of the reaction starting liquids but is usually 200° to 230° C., and sometimes 235° C. or higher.

By controlling temperature differences to less than 80° C. inside the reaction product during the cooling period from the maximum curing exothermic temperature of the reaction product to the glass transition temperature of said reaction product after bulk polymerization, formation of pores can be prevented and, in particular, a large molding for grinding can be manufactured.

Temperature differences inside the reaction product should be kept to less than 80° C., preferably less than 70° C., and most preferably less than 50° C., when the product is cooled from the maximum curing exothermic temperature to the glass transition temperature of the reaction product. The temperature differences inside the reaction product are usually at their maximum between the center of the thick-walled section and the section next to the mold. Therefore, the entire reaction product is uniformly cooled while restricting temperature differences to less than 80° C.

There are no special restrictions to the method for cooling while restricting temperature differences. An actual example is the method whereby when the reaction product reaches the maximum curing exothermic temperature, the outside of the mold is heated with steam or by an electric heater to keep temperature differences at the desired level. The heating temperature is selected so that the temperature difference is as high as possible under the aforementioned conditions and is important in terms of increasing the cooling rate and in terms of productivity.

The temperature of the mold is reduced while cooling the reaction product. When the reaction product is cooled to a temperature below the glass transition temperature, the temperature of the reaction product will have no effect on the formation of pores or nests, even if the reaction product is cooled quickly thereafter.

With regard to the cooling method, cooling can be performed by reducing pressure and introducing water when steam is used as the heating means, or cooling can be performed by reducing the current when an electric heater is used. A cooling device can be set up in the individual molds, or a common cooling device can be used for several molds together.

In order to restrict the aforementioned temperature differences, it is preferred that the temperature of the mold be controlled by introducing a temperature sensor to the reaction product. However, once the composition of the reaction starting liquid and pot life have been determined, the reaction temperature and cooling speed can be changed over time by the same pattern. Therefore, when pretesting is performed and the appropriate cooling speed is determined, it is not always necessary to introduce a temperature sensor to the individual molds.

The properties of the thick-walled molding of this invention can be improved by combining additives such as fillers, paints, dyes, antioxidants, elastomers, dicyclopentadiene thermopolymerization resins, flame retardants, etc.

In particular, when an antioxidant is added to the reaction product, the ignition temperature of the polymer can be adjusted to 120° C. or more. Therefore, ignition during cutting or ignition of the cutting scraps do not occur. Moreover, it is possible to obtain a thick-walled molding that is superior in cutting properties because it shows no discoloration or deformation during cutting, etc.

The filler can be an inorganic filler such as mica, glass, carbon black, talc, calcium carbonate, etc.

The elastomer can be a natural rubber, polybutadiene, polyisoprene, styrene-butadiene copolymer (SBR), styrene-butadiene-styrene block copolymer (SBS), styrene-isoprene-styrene block copolymer (SIS), ethylene-propylene-diene terpolymer (EPDM), ethylene vinyl acetate copolymer (EVA), and their hydrogenated products.

One or more of these additives can be premixed with the reaction solution.

By means of this invention, an essentially pore-free, high quality molding with a thick section can be efficiently obtained. Monomer conversion to polymer in the polymer molding is in excess of 98%. Here, the pores can be seen when their cross section is observed with the naked eye and have a diameter of approximately 0.1 mm or more. Said pores can be found by passing ultrasonic waves of 0.5 to 10 megahertz through the molding and detecting scattering of the reflected waves. Moreover, the term pore-free essentially means that when the molding is cut at 100 mm intervals, no pores are found in the cross sections.

The shape of the thick-walled molding of this invention can be a round bar, a square bar, a sheet, a pipe, etc. In addition, it can be a three-dimensional molding of the desired shape. Moreover, the thick-walled molding has at least one section that is at least 20 mm or more, preferably 50 mm or more in diameter or thickness, and its shape is selected in accordance with the purpose for which the molding will be used. Since RIM is employed, large moldings can be easily obtained. For instance, thick-walled round bar molding that is approximately 500 mm in diameter or larger can be made. As an example of thick-walled molding, thick-walled molding weighing 50 kg or more can be easily manufactured.

By means of this invention, thick-walled molding, such as materials for grinding, casings of plastic pumps, motor bases of pumps, thick-walled boxes, large-diameter thick-walled pipes, tanks, etc., can be obtained with good productivity.

This invention will now be explained in actual terms using examples presented below. However, this invention is not limited to these examples only. Moreover, the parts and percentages are by weight unless otherwise noted.

EXAMPLE I

Dicyclopentadiene (DCP) containing 2% phenol antioxidant (Irganox 259 from Ciba-Geigy) was introduced to two vessels. then, diethylaluminum chloride (DEAC) at a concentration of 33 millimoles per mole of DCP, n-propanol at a concentration of 34.6 millimoles per mole of DCP, and silicon tetrachloride at a concentration of 20 millimoles per mole of DCP were added to one vessel. Tri(tridecyl)ammonium molybdate was added to the other vessel at a concentration of 4 millimoles per mole of DCP. The pot life of the reaction starting liquid was 1 minute at 25° C.

The two reaction liquids, which were kept at the desired temperature, were mixed at a ratio of 1:1 using a gear pump and power mixer and injected under normal pressure to steel molds. The molds were then pressurized to the desired pressure. These series of operations were performed in a nitrogen atmosphere.

Blocks of round rods that were obtained in this manner were cut at intervals of 100 mm in the direction of height and then their cross sections were observed with the naked eye. The results are shown in Table 1, below.

Moreover, the glass transition temperature (Tg) of each block was 145° to 150° C. and weight loss with heating, as determined by a thermobalance, was within a range of 2 to 3%. This indicated that in all blocks, the reaction had proceeded to completion.

Furthermore, as a result of determining ignition temperature by differential thermal analysis under a high oxygen pressure of 10 kg/cm$^2$, all blocks showed values exceeding 120° C.

TABLE 1

|  | Examples of this invention | | | Comparative examples | |
|---|---|---|---|---|---|
| Example No. | 1 | 2 | 3 | 4 | 5 |
| Shape of mold |  |  |  |  |  |
| Diameter (mm φ) | 50 | 75 | 100 | 75 | 75 |
| Height (mm) | 800 | 800 | 800 | 800 | 800 |
| Reaction starting liquid temperature (°C.) | 25 | 30 | 25 | 25 | 25 |
| Rod temperature (°C.) | 20 | 15 | 15 | 15 | 30 |
| Pressure inside mold (kg/cm3 -G) | 1 | 2 | 2 | 0 | 2 |
| Time until heat is first emitted (minutes) | 7 | 6 | 8 | 8 | 5 |
| Maximum curing exothermic temperature (°C.) | 225 | 223 | 220 | 220 | 230 |
| Pressence of pores* | c | c | c | X | X |

*1 Cross sections made at intervals of 100 mm were checked for pores that were 0.1 mm or larger. c = there were no pores whatsoever, [triangle] = 1 to 9 pores, X = 10 or more pores.

As is clear from Table 1, when the temperature of the reaction starting liquid is higher than the temperature of the inside of the mold and the mold is pressurized, Examples 1 through 3 in Table 1, above, pores are not seen in the cross sections of the block, even if the maximum curing temperature of the reaction product is 160° C. or higher. However, many pores were found in the Comparative Examples, Examples 4 through 5 in Table 1, above, which were made with mold temperature being higher than the reaction starting liquid temperature and without pressurization.

EXAMPLE II

The same reaction starting liquid as in Example I was injected into a steel mold with a jacket that had an inner diameter of 300 mm and height of 500 mm. The temperature of the reaction starting liquid was 25° C. and mold temperature was 15° C. After injection, pressure of 2 kg/cm$^2$-G was applied with nitrogen gas. Heat began to be emitted 7 minutes after injection and the maximum curing exothermic temperature was 225° C. Steam was passed through the jacket once the maximum curing exothermic temperature was reached. The product was gradually cooled to the glass transition temperature while keeping the temperature difference between the center of the inside of the mold or the center of the reaction product and the mold at 50° to 55° C. The cooling time from the maximum curing exothermic temperature to the glass transition temperature was 160 minutes.

The blocks of round bars obtained in this manner were cut at intervals of 100 mm in the direction of height and checked for the presence of pores with the naked eye. As a result, no pores whatsoever were detected.

By means of the method of this invention, it is possible to obtain with good productivity a substantially pore-free, high quality thick-walled molding of a polycyclic norbornene polymer that is of low hygroscopicity, good dimensional stability, and superior heat resistance.

We claim:

1. A method for making an essentially pore-free polymer molding having a thick section of at least 20 mm comprising injecting into a mold a liquid monomer charge containing a methathesis ring-opening catalyst system, said charge being at a temperature higher than the inside temperature of said mold, polymerizing said monomer charge in said mold under pressure and cooling the reaction product while controlling the temperature difference between the interior of said reaction product and the exterior of said reaction product below 80° C. during the cooling period spanning from the maximum exotherm temperature to the glass transition temperature of said reaction product, wherein said monomer charge contains at least one norbornene monomer containing at least three cyclic groups.

2. The method of claim 1 wherein said monomer charge includes a predominant amount of dicyclopentadiene and a smaller amount of a mixture of cyclopentadiene trimers.

3. The method of claim 1 wherein said monomer charge includes a predominant amount of dicyclopentadiene.

4. The method of claim 1 wherein said norbornene monomer is selected from the group consisting of tricyclic monomers, tetracyclic monomers, pentacyclic monomers, and mixtures thereof.

5. The method of claim 4 wherein said thick section is at least 50 mm.

6. The method of claim 1 wherein said catalyst system includes a catalyst component and a cocatalyst component, said catalyst component is selected from the group consisting of organoammonium molybdates, organoammonium tungstates, tungsten hexachloride, tungsten oxytetrachloride, tungstenoxide, molybdenum pentachloride, molybdenum oxytrichloride, tantalum pentachloride, and mixtures thereof and said cocatalyst component is selected from the group consisting of alkoxyalkylaluminum halides, aryloxyalkyl aluminum halides, alkylaluminum halides, the reaction product of alkylaluminum halides and an alcohol, organotin compounds, and mixtures thereof.

7. The method of claim 1 wherein said temperature difference during said cooling step is less than 70° C. and wherein said pressurizing step is carried out by increasing pressure in said mold by at least 0.5 kg/cm$^2$ while polymerizing said monomer charge.

8. The method of claim 1 wherein said temperature difference during said cooling step is less than 50° C. and wherein said pressurizing step is carried out by increasing pressure in said mold by at least 1 kg/cm$^2$ while polymerizing said monomer charge.

9. The method of claim 6 wherein said monomer charge is at least 5° C. higher than the inside temperature of the mold.

* * * * *